United States Patent [19]

Sartori et al.

[11] 4,100,128

[45] Jul. 11, 1978

[54] OIL-PLASTICIZED COPOLYMERS OF $SO_2$ AND OLEFINS

[75] Inventors: Guido Sartori, Linden; Robert D. Lundberg, Somerville, both of N.J.

[73] Assignee: Exxon Research & Engineering Co., Linden, N.J.

[21] Appl. No.: 787,367

[22] Filed: Apr. 14, 1977

Related U.S. Application Data

[63] Continuation-in-part of Ser. No. 634,881, Nov. 24, 1975, abandoned.

[51] Int. Cl.$^2$ .......................... C08G 75/18; C08K 5/01
[52] U.S. Cl. .............................. 260/33.6 UA; 528/386
[58] Field of Search .................. 260/33.6 UA, 79.3 A

[56] References Cited

U.S. PATENT DOCUMENTS 3,409,548  11/1968  Harper et al. ...................... 252/8.55
3,728,185  4/1973  Gray ................................... 260/42.18

*Primary Examiner*—Donald E. Czaja
*Assistant Examiner*—H. H. Fletcher
*Attorney, Agent, or Firm*—Richard E. Nanfeldt

[57] ABSTRACT

The instant invention relates to compositions comprising a copolymer of sulfur dioxide and one or more olefins in combination with a hydrocarbon oil which is a mixture of paraffinic, aromatic and naphthenic hydrocarbons having a solubility parameter of about 7 to about 8.5. The olefins are alpha olefins, at least one having a carbon number of 20 or more, more preferably a carbon number of from 20 to 40. The copolymers useful in preparing the compositions of the instant invention are crystalline solids, which are combined with a sufficient amount, preferably from about 5 to 24 pph, of the hydrocarbon oil to yield flexible materials. The above compositions are useful as coatings.

6 Claims, No Drawings

OIL-PLASTICIZED COPOLYMERS OF SO₂ AND OLEFINS

CROSS REFERENCES TO RELATED APPLICATIONS

This application is a Continuation-in-Part of Ser. No. 634,881 filed 11/24/75, and now abandoned.

FIELD OF THE INVENTION

The instant invention relates to compositions comprising a copolymer of sulfur dioxide and one or more olefins in combination with a hydrocarbon oil which is a mixture of paraffinic, aromatic, and naphthenic hydrocarbons having a solubility parameter of about 7 to about 8.5. The olefins are alpha olefins, at least one having a carbon number of 20 or more, more preferably a carbon number of from 20 to 40. The copolymers useful in preparing the compositions of the instant invention are crystalline solids, which are combined with a sufficient amount, preferably from about 5 to 24 pph, of the hydrocarbon oil to yield flexible materials. The above compositions are useful as coatings.

BACKGROUND OF THE PRIOR ART

Copolymers of alpha-olefins and $SO_2$ are well known in the art. These polymers may be prepared by various processes, including bulk, solution and emulsion polymerization. These copolymers have various uses, especially as thickeners for crude oil, coatings and viscosity index improvers. Copolymers of $SO_2$ and higher alpha olefins are also well known. For example, see U.S. Pat. No. 3,409,548 which describes the use of polysulfone copolymers (in oil based, fracturing fluids, i.e. $SO_2$ copolymerized with an alpha olefin having from 8 to 42 carbon atoms). The compositions taught in this reference differ from the instant compositions, since a fracturing fluid must be a liquid to be useful. Thus, the amount of oil combined with the polysulfone copolymer is sufficient to dissolve the copolymer in the oil. In the instant composition the oil and copolymer ratio is adjusted so that the oil is dissolved in the polymer to yield flexible materials. The instant compositions, of course, are not useful as fracturing fluids, and indeed have uses not contemplated by the patentees, e.g., as coatings.

A paper by Crawford and Gray (J. Appl. Polymer Sci. 15, 1881 (1971)) teaches copolymers of alpha olefins and sulfur dioxide and suggests that the use of longer chain olefins would result in brittle copolymers due to the crystallization of the longer chains. The materials thus suggested would be brittle and of limited use in preparing coatings, etc. To obtain flexible materials, the same authors in German Application No. 2,308,415 suggest copolymerization of a low-carbon-number olefin along with a higher olefin to effect plasticization of the copolymer. Thus, the reference suggests the polymerization of at least three different monomers to prepare the useful flexible olefin-$SO_2$ copolymers.

U.S. Pat. No. 3,728,185 teaches compositions comprising a pyrolyzable olefin $SO_2$-polymer and an extender which can have from 20 to 50 wt. % of a plasticizer incorporated into the polymer. The composition has a finely divided fusible or sinterable inorganic material incorporated therein. The oil plasticizers of the instant invention have a significantly higher solubility parameter and a lower molecular weight than the polyisobutylene plasticizers of U.S. Pat. No. 3,728,185 thereby making the plasticizers of the instant invention more readily compatible with the polymers. Additionally, U.S. Pat. No. 3,728,185 does not teach the plasticization of a rigid and brittle copolymer having more than twenty carbon atoms to obtain a flexible composition. The copolymers of Gray (e.g. 1-hexadecene) are flexible to begin with as clearly seen at column 4, line 24 whereas the instant invention teaches the use of olefins with at least 20 carbon atoms to obtain copolymers having improved strengths.

U.S. Pat. No. 3,409,548 teaches $SO_2$-olefin copolymers which are useful as a fracturing fluid. These compositions are liquids and not solids as taught by the instant invention. The copolymer is dissolved in oil whereas in the instant application the oil is dissolved in the copolymer. Additionally, the copolymers of U.S. Pat. No. 3,409,548 are covalently crosslinked, whereas the copolymers of the present invention are completely soluble and gel free.

In the instant invention, the necessity of including a low carbon number olefin is eliminated since a broad range of hydrocarbon oils has been unexpectedly found to plasticize the copolymer to yield flexible compositions. Thus, the difficulties of polymerizing an additional monomer are avoided. It is noted that nowhere in the above reference is it taught, shown or suggested that hydrocarbon oils can be used to convert brittle copolymers of $SO_2$ and higher alpha olefins into flexible materials.

SUMMARY OF THE INSTANT INVENTION

It has now unexpectedly been discovered that flexible, high strength materials may be prepared by combining an olefin-$SO_2$ copolymer with a hydrocarbon oil which is a mixture of paraffinic, aromatic and naphthenic hydrocarbons having a solubility parameter of about 7 to about 8.5. These materials are useful as coatings and flexible plastics.

In the compositions of the instant invention, the respective amounts of the copolymer and hydrocarbon are adjusted so that the copolymer provides the major phase, that is the instant invention relates to the plasticized copolymers. Thus, the amount of hydrocarbon combined with the copolymer will be such as to maintain the structural properties of the copolymer. To be more precise, solutions of said copolymers in hydrocarbon oil are not contemplated as being within the scope of the instant invention.

The copolymers useful in preparing the compositions of the instant invention comprise sulfur dioxide in combination with a copolymerizable olefin, preferably an alpha olefin. The alpha olefin will have a carbon number such that brittle compositions are obtained when said alpha olefin is copolymerized with sulfur dioxide. Preferably, the alpha olefins will have a carbon number of at least 20 or more, more preferably from 20 to about 40. Examples of this preferred class of alpha olefins include 1-eicosene, 1-docosene, 1-tetracosene, etc. The olefin may be substantially pure or comprise a mixture of one or more of said higher alpha olifins. Additionally, a small amount of lower olefins can be tolerated in the olefin mixture which is to be copolymerized with sulfur dioxide provided, however, the copolymer when prepared is a brittle material. More particularly, the copolymer should have a softening point of at least 40° C., more preferably 40° to 80° C. Examples of some mixtures of alpha olefins which are suitable for copolymerizing with sulfur dioxide to prepare the brittle copolymers used in preparing the compositions of the instant invention include the $C_{20}$-$C_{24}$ cut prepared by the ethylene oligomerization processes known in the art.

The copolymers of the instant invention are nonrandom in that a regular alternating structure is obtained. The placement of the long chain alkane group at alternating intervals is critical to the degree of crystallization and to the resulting polymer properties. As previously noted, a small amount of a second alpha-olefin can be incorporated to form a terpolymer, however the amount of this component should not be sufficient to substantially interfere with the crystallization of the alkane side chains.

The brittle olefin-$SO_2$ copolymer may be prepared by the various methods known in the art, for example, solution and emulsion polymerization processes may be utilized as described.

In general, the olefin will comprise from 80 to 90 wt. % of the copolymer. The remainder of the copolymer will comprise $SO_2$. For example, the copolymers will comprise from 5.0 to 9.5, preferably from 8 to 9.3 wt. % sulfur. It should be noted that a sufficient amount of alpha olefin having at least 20 carbon atoms must be present to provide a brittle copolymer as described above but other than that the addition of third monomers, especially lower carbon number olefins, is within the scope of the instant invention.

The most preferred copolymers will consist of sulfur dioxide and one or more alpha-olefin having at least 20 carbon atoms. These materials will have a softening point of at least 40° C. and comprise from 8 to 9.3 wt. % sulfur.

The copolymers useful in preparing the compositions of the instant invention will have a reduced viscosity of at least 0.7 dl/g measured at 25° C. in a solution containing 0.2 g in 100 ml of chloroform.

The above-described copolymers in unmodified form are brittle and thus of little use in various applications such as coatings. In the prior art, materials of this nature have been utilized as solutions wherein their brittleness does not interfere with their function. It is known in the art to soften brittle copolymers to provide flexible materials by a process known as plasticization, that is a high boiling liquid is combined with a brittle copolymer in an amount sufficient to form flexible materials. The plasticizing material must be compatible with the copolymer so that combination therewith is facilitated. While, in general, it is known in the art to plasticize brittle polymers in order to provide flexibility, only specific combinations of high boiling liquids and brittle copolymers may be used to provide useful materials. For example, many liquids will plasticize brittle polymers but will yield flexible compositions which exude the liquid, are tacky, and have little or no strength. Thus, it is desired in the art to provide plasticized compositions having flexibility in combination with strength.

Various well-known plasticizers when combined with the copolymers described above do not yield flexible compositions having strength. For example, dialkyl phthalates and trialkyl phosphates which are representative of classes of liquids known for their plasticizing ability in polyvinyl chloride yield tacky products having no strength if combined in an amount sufficient to yield flexible compositions. If lesser amounts are used so as to reduce tackiness and maintain strength, the brittleness of the polymer is not substantially changed.

Thus, plasticizing brittle olefin-$SO_2$ copolymers with well known plasticizers does not result in the compositions having properties useful in coatings. As has been noted above, additional monomers, for example, lower carbon number olefins, may be copolymerized to yield compositions having flexibility and strength. However, this approach requires the copolymerization of at least three monomers resulting in the usual difficulties encountered when additional monomers are copolymerized in a polymerization process.

It has also been observed that copolymers of sulfur dioxide and alpha olefins having less than 20 carbon atoms, for example, 14 or 16, provide elastic products without the necessity of plasticization, but these materials have little strength and therefore are of no practical importance.

The combination of the above-described brittle olefin-$SO_2$ copolymers with nonpolar oils, especially hydrocarbon oils, provide plasticized materials which are tough, clear and flexible. The skilled artisan will combine the nonpolar oil in an amount sufficient to provide flexibility without loss of strength; however, in general, the hydrocarbon is combined with the brittle copolymer in an amount of from about 5 to 24 parts by wt. per hundred parts polymer. The nonpolar oils which are suitable for plasticization of the brittle copolymers described above will have a solubility parameter of about 7.0 to about 8.5, more preferably about 7.25 to about 8.5.

The nonpolar hydrocarbon oils of the instant invention are a mixture of paraffinic, aromatic and naphthenic hydrocarbons, wherein the desirable weight percent of naphthenic is about 5 to about 40 wt. %, more preferably 10 to about 40 wt. % and most preferably about 20 to about 40 wt. %.

The products of the instant invention will be combined with sufficient nonpolar oil to yield compositions having one softening point which is below room temperature, for example about −60° C. In general, the hydrocarbon nonpolar oils are preferred, for example, naphthenic, paraffinic etc. oils which are characterized as made up of hydrocarbons having an average carbon number of from 15 to 38, and are useful in the process of the instant invention. The molecular weight of the hydrocarbon oils useful in preparing the compositions of the instant invention can vary between 200 and 540. The specific gravity of these hydrocarbon oils at 60/60° F. can range from 0.85 to 1.03. Preferably, the paraffinic carbon atoms present in said hydrocarbon oils will be at least 25%. Various specific hydrocarbon oils which are useful in the instant process include Flexon 340, Primol D and Sundex 53, the properties and source of which are described below. Plasticization can be carried out by dissolving the polymer and the oil in toluene and evaporating the solvent. Alternatively, the oil and copolymer can be dry blended with agitation and subsequently thermally formed. This technique is useful when modest levels of oil are to be incorporated.

The compositions of the instant invention, as stated above, are useful as coatings. However, these materials are also useful in manufacturing shaped articles. It has been found to be advisable to remove as completely as possible the unreacted starting olefins from the copolymer in order to avoid oil exudation of the plasticized product.

The following are specific embodiments of the instant invention. There is no intent, however, to be limited thereto.

EXAMPLE 1

The reaction apparatus is a 4-necked, 1-liter flask, equipped with thermometer, 3-way stopcock, Teflon blade stirrer and dropping funnel. 180 ml of benzene and 48 g of a mixture of $C_{20}$-$C_{24}$ alpha olefins (containing 50 wt. % $C_{20}$, 40 wt. % $C_{22}$ and 10 wt. % $C_{24}$ olefins) are put into the flask. When dissolution is complete, the solution is cooled with ice-water. 40 ml of liquid $SO_2$ is added. Then from the dropping funnel 10 ml of a solution of .8 ml of t-butyl hydroperoxide in 40 ml of benzene is added gradually. The temperature rises to 14° C. and the mass becomes thicker. The reaction is allowed to continue for another 40 minutes, then hydroquinone is added. Benzene is allowed to evaporate, then the residue is dried in vacuo, yielding 56.5 g of material haing a reduced viscosity of 37 dl/g at 25° C. in chloroform (.2 g in 100 ml). 10 g of the residue is stirred with 500 ml of pentane for 7 hours and 5.5 g remains undissolved. The dissolved portion is unreacted olefins and low molecular weight copolymer and the nonsoluble portion is pure olefin-$SO_2$ copolymer. The reduced viscosity of the pentane-insoluble fraction is 0.51 dl/g at 25° C. in chloroform (.2 g in 100 ml). The sulfur content of the pentane insoluble fraction is 8.7%. This fraction is treated with various plasticizers by casting films from benzene solution, the plasticized samples are molded at 150° F. and their flexibility is examined. The results are summarized in Table I.

TABLE I
INFLUENCE OF DIFFERENT PLASTICIZERS ON THE FLEXIBILITY OF AN $SO_2$—$C_{20}$—$C_{24}$—OLEFIN COPOLYMER (RESIDUE TO PENTANE)

| Plasticizer | Wt. % Based on Olefin — $SO_2$ Copolymer | Appearance of product |
|---|---|---|
| Dimethyl Phthalate | 10 | Clear, Brittle |
| Diethyl Phthalate | 10,20 | Brittle |
|  | 40,50 |  |
| Dibutyl Phthalate | 10 | Brittle |
| Dioctyl Phthalate | 10 | Brittle |
| Triethyl Phosphate | 10 | Brittle, Exudation Present |
| Tributyl Phosphate | 10 | Opaque, Brittle |
|  | 100 | Brittle, Exudation Present |
| Primol D | 5,10,20 | Tough, Flexible, Clear |
| Flexon 340 | 10,20 | Flexible |
| Sundex 53 | 10,24 | Flexible |

NOTE:
Primol D is a low viscosity oil, containing more than 60% paraffinic carbon atoms, manufactured and sold by Exxon Chemical Company. Solubility parameter = 7.3; Mn = 500; specific gravity = 0.885; Nat 20° C = 240CS.
Flexon 340 is a low viscosity oil, containing 28% paraffinic carbon atoms, 41% naphthenic carbon atoms and 31% aromatic carbon atoms, manufactured and sold by Exxon Chemical Company. Solubility parameter 8.0 ± 0.5; Mn = 500; Nat 100° F =29802WS; specific gravity = 0.9834.
Sundex 53 is a hydrocarbon oil containing 25% paraffinic carbon atoms, 28% naphthenic carbon atoms and 37% aromatic carbon atoms, manufactured and sold by Sunoco. Solubility parameter - 8.0 ± 0.5; Mn = 500; specific gravity = 0.9522; Nat 100° F =26.6 cs.

EXAMPLE 2

By contrast, an alternating butene-$SO_2$ copolymer obtained by free-radical polymerization plasticized with 70 parts of tributyl phosphate yields a clear, tacky film with low strength. This butene-$SO_2$ copolymer was prepared by free radical polymerization in toluene at ambient pressure and temperature, using t-butyl hydroperoxide as the initiator. This copolymer contained 26.6% sulfur and a reduced viscosity of 0.6 dl/g as measured at 25° C. in a solution of 0.2 g copolymer/100 ml $CCl_3H$. A plasticized composition of the same butene-$SO_2$ copolymer with 40 pph of Flexon 340 was prepared by casting from a solution comprising 1 g of said copolymer and 0.4 g of Flexon 340 in 10 ml of tetrahydrofuran (THF) evaporating the THF and molding at a temperature of 170° F., a pressure of 2 tons for 5 minutes. This composition was very brittle, had a cracked surface, and exuded oil.

Since many modifications and variations of this invention may be made without departing from the spirit or scope of the invention thereof, it is not intended to limit the spirit or scope thereof to the specific examples thereof.

What is claimed is:
1. A flexible composition consisting of:
   (a) 100 parts by weight of an olefin-$SO_2$ copolymer, said olefin-$SO_2$ copolymer having a softening point of at least about 40° C., said olefin-$SO_2$ copolymer being formed from at least one alpha olefin having at least 20 carbon atoms, said copolymer having about 5 to about 9.5 wt. % of sulfur; and
   (b) about 5 to about 24 parts per hundred by weight based on 100 parts of said copolymer of a nonpolar oil having a number average molecular weight of about 200 to about 540, a solubility parameter of about 7.0 to about 8.5, and at least about 10 wt. % of naphthenic hydrocarbons.
2. The composition of claim 1, wherein said copolymer additionally comprises 1 to 15 wt. % of a $C_8$-$C_{12}$ olefin copolymerized therewith.
3. A dry blend consisting of a free flowing copolymer of $SO_2$ and an alpha olefin having a carbon number of at least 20, in combination with 5 to 24 parts of a nonpolar oil having at least about 10 wt. % naphthenic hydrocarbons and with a solubility parameter less than 9.0, said dry blend being free flowing at room temperature and capable of being subsequently fused at elevated temperatures.
4. A composition of claim 1, wherein said copolymer has a regular alternating structure.
5. A composition of claim 1, wherein said hydrocarbon oil has at least 25 wt. % of paraffinic carbon atoms.
6. A composition of claim 1, wherein said composition is deposited as a coating on a substrate.

* * * * *